US012236670B1

(12) United States Patent
Liao et al.

(10) Patent No.: US 12,236,670 B1
(45) Date of Patent: Feb. 25, 2025

(54) CLASSIFICATION METHOD FOR PRODUCT QUALITY ACCIDENTS AND ITS SYSTEM BASED ON CONVOLUTIONAL NEURAL NETWORKS

(71) Applicant: China National Institute of Standardization, Beijing (CN)

(72) Inventors: Jingxing Liao, Beijing (CN); Jingna Yang, Beijing (CN); Yuwei Lu, Beijing (CN)

(73) Assignee: China National Institute of Standardization, Beijing (CN)

( * ) Notice: Subject to any disclaimer, the term of this patent is extended or adjusted under 35 U.S.C. 154(b) by 0 days.

(21) Appl. No.: 18/778,875

(22) Filed: Jul. 19, 2024

(51) Int. Cl.
*G06V 10/771* (2022.01)
*G06Q 10/0637* (2023.01)
*G06T 7/00* (2017.01)
*G06V 10/82* (2022.01)

(52) U.S. Cl.
CPC ..... *G06V 10/771* (2022.01); *G06Q 10/06375* (2013.01); *G06T 7/001* (2013.01); *G06V 10/82* (2022.01); *G06T 2207/30108* (2013.01)

(58) Field of Classification Search
CPC .......... G06V 10/771; G06V 10/82; G06Q 10/06375; G06T 7/001; G06T 2207/30108
See application file for complete search history.

(56) References Cited

U.S. PATENT DOCUMENTS

| 2002/0013685 A1 | 1/2002 | Kidd et al. |
| 2013/0287264 A1 | 10/2013 | Chen et al. |
| 2021/0073563 A1* | 3/2021 | Karianakis ............. G06V 20/41 |

FOREIGN PATENT DOCUMENTS

| CN | 106327108 A | | 1/2017 |
| CN | 110232333 A | * | 9/2019 |
| CN | 117726240 A | | 3/2024 |
| CN | 117952482 A | * | 4/2024 |

* cited by examiner

*Primary Examiner* — Samir A Ahmed

(57) ABSTRACT

The present invention is related to the field of quality control technology, specifically disclosing a classification method for product quality accidents and its system based on convolutional neural networks. The method consists of: collecting the sample data of product quality accidents, and grading the severity of accidents for each product with the quality accident; then extracting the image feature elements of various products with quality accidents and a valid feature element screening is performed; after that, a product quality accident classification model can be generating through training various valid feature elements and then the product quality accident is classified. The present invention can reduce the subjective errors due to human judgment, and thus the objectivity and consistency of the quality accident assessment results can be improved.

10 Claims, 2 Drawing Sheets

To collect the sample data of product quality accidents, label the products that suffered quality accidents as the products with quality accidents, respectively, and thus the accident severity evaluation indices of various products with quality accidents can be generated by analyzing, in addition, to grade the severity of accidents for each product with the quality accident based on the accident severity evaluation indices.

To extract the image feature elements of each product with the quality accident, and the evaluation values of accident relevance of various image feature elements can be obtained by analyzing, after that, a valid feature element screening is performed according to the evaluation values of accident relevance of various image feature elements.

To train a product quality accident classification model based on various valid elements after screening, and the product quality accidents are classified according to the image data of product quality accidents through the product quality accident classification model.

Fig. 1

CLASSIFICATION METHOD FOR PRODUCT QUALITY ACCIDENTS AND ITS SYSTEM BASED ON CONVOLUTIONAL NEURAL NETWORKS

CROSS-REFERENCE TO RELATED APPLICATIONS

This application claims priority of Chinese Patent Application No. 202410349918.0, filed on Mar. 26, 2024, the entire contents of which are incorporated herein by reference.

TECHNICAL FIELD

The present invention is related to the field of quality control technology, specifically a classification method for product quality accidents and its system based on convolutional neural networks.

BACKGROUND TECHNOLOGY

The product quality accident classification refers to the method for classifying quality issues or accidents that occur during the production and use of products. In actual production, product quality accidents may cause different degrees of impact, such as stagnant production, economic losses and safety accidents, etc. The traditional methods for product quality accident classification usually rely on human experience, with strong subjectivity and lack of objectivity and accuracy. As a result, it is impossible to identify and accurately evaluate the severity of accidents in a timely manner, thereby affecting the quality management decisions of companies. For this reason, it is necessary to provide a classification method for product quality accidents and its system based on convolutional neural networks to help companies better manage quality.

Taking the invention patent (publication number: CN112241832B) as an example, which disclosed a design method for classification and evaluation standards of product quality and its system, including: obtaining a data set consisting of the technical parameters of the full process and the corresponding mechanical performance indices; screening the technical parameters based on the mutual information between the various technical parameters and the mechanical performance indices, and thus a feature subset and mechanical performance prediction model could be built; after that, performing multi-output sensitivity analysis on the mechanical performance prediction model to generate the estimated sensitivity indices of each technical parameter in the feature subset, and further the vector ω consisting of the sensitivity indices of each technical parameter could be generated; then, updating the column vector X consisting of feature subsets to ω X; and completing spectral clustering on the sample set corresponding to the ω X to classify the sample categories, as well as establishing corresponding relationships with the final quality index "narrow window" for different sample categories to form corresponding quality classification evaluation standards. This application, developed based on real historical big data of production, simulates the range of quality indices corresponding to various technical parameters in advance and further facilitates steel enterprises to quantitatively control product quality performance.

According to the above scheme, it is found that there are still some shortcomings in quality control, which are reflected in the following aspects: (1) There is no unified standard for the classification of quality accidents, and the analysis of product quality accidents is incomprehensive. For example, no analysis has been performed from the point of view of images of product quality accidents and economic losses, making it impossible to accurately classify product accidents.

(2) The existing classification of product quality accidents mainly relies on human judgment, making the subjective errors are inevitable, which can easily lead to inconsistent results in the classification of product quality accidents.

SUMMARY OF THE INVENTION

In response to the shortcomings of existing technology, the present invention provides a classification method for product quality accidents and its system based on convolutional neural networks, which can effectively solve the problems involved in the aforesaid background technology.

For the purpose of achieving the above objectives, the present invention is implemented through the following technical scheme: the first aspect of the present invention provides a product classification of quality accidents method based on convolutional neural networks, which consists of: collecting the sample data of product quality accidents, labeling the products that suffered quality accidents as the products with quality accidents, respectively, and thus the accident severity evaluation indices of various products with quality accidents can be generated by analyzing.

Extracting the image feature elements of each product with the quality accident, and the evaluation values of accident relevance of various image feature elements can be obtained by analyzing based on the accident severity evaluation index for each product with the quality accident, after that, a valid feature element screening is performed according to the evaluation values of accident relevance of various image feature elements to obtain various valid feature elements.

Based on each valid feature element, a product quality accident classification model is trained to obtain the target product and classify the product quality accident through the product quality accident classification model.

As a further method, the specific analysis process for obtaining the said accident severity evaluation index for each product with the quality accident consists of: extracting the initial images and images of quality accidents of each product with the quality accident based on the sample data of product quality accidents, and then comparing the initial images with the images of quality accidents of each product with the quality accident, and thus a quantitative index for the degree of damage of each product with the quality accident can be generated by analyzing.

Obtaining the cost data of repairing each product with the quality accident and calculating the time it took to repair, and thus a quantitative index for the impact degree of each product with the quality accident can be generated after processing.

Then, the accident severity evaluation index for each product with the quality accident can be generated by a comprehensive analysis.

As a further method, the said quantitative index for degree of damage of each product with the quality accident refers to a quantitative evaluation data obtained by comparing and analyzing the initial images with the images of quality accidents of each product with the quality accident, which can be used to quantitatively evaluate the degree of damage of each product with the quality accident and provide a data basis for the classification of quality accident.

As a further method, the specific analysis process for obtaining the evaluation values of accident relevance of various image feature elements consists of obtaining the image entropy value and the image contrast index for each product with the quality accident through processing based on the image of quality accident of each product with the quality accident, and thus the feature quantification values of various image feature elements of each product with the quality accident can be obtained by a comprehensive analysis.

Based on the accident severity evaluation index for each product with the quality accident and the feature quantification values of various image feature elements of each product with the quality accident, the evaluation values of accident relevance of various image feature elements can be obtained by analysis.

As a further method, the specific analysis process of obtaining various image feature elements by screening valid feature elements based on the evaluation values of accident relevance of various image feature elements consists of comparing the evaluation values of accident relevance of various image feature elements with the threshold values of accident relevance stored in the quality control database. If the evaluation value of accident relevance of a certain image feature element is greater than or equal to the threshold value of accident relevance, such image feature element shall be labeled as a valid feature element.

As a further method, the said accident severity evaluation index for each product with the quality accident refers to the quantitative evaluation value obtained by analyzing the quantitative index for damage degree and impact degree of each product with the quality accident, which can be used to quantitatively evaluate the accident severity of each product with the quality accident and provide the data basis for classification of quality accidents.

As a further method, the said feature quantification values of various image feature elements of each product with the quality accident refer to the quantitative data of various image feature elements obtained by quantitatively analyzing such image feature elements in terms of two dimensions including image entropy and image contrast index, which is used to quantitatively evaluate the severity of each image feature element, and provide a data basis for screening valid feature elements.

As a further method, the specific calculation expression of the accident severity evaluation index for each product with the quality accident is:

$$\delta_i = \frac{lg\left(\sqrt{\varphi_{S \to i} * \xi_1 + \varphi_{Y \to i} * \xi_2} + 1\right)}{e},$$

wherein, $\delta_i$ refers to the accident severity evaluation index for the $i^{th}$ product with the quality accident, e refers to a natural constant, $\varphi_{S \to i}$ refers to the quantitative index of the damage degree of the $i^{th}$ product with the quality accident, and $\varphi_{Y \to i}$ refers to the quantitative index of the impact degree of the $i^{th}$ product with the quality accident, $\xi_1$ refers to the accident severity impact factor corresponding to the given quantitative index of the damage degree, as well as $\xi_2$ refers to the accident severity impact factor corresponding to the given quantitative index of the impact degree.

As a further method, the specific calculation expression of the feature quantification values of various image feature elements of each product with the quality accident is:

$$\chi_{ir} = \left(\frac{1}{e}\right)^{\frac{1}{\sqrt{\tau_{S \to r} * H(S)_i + \tau_{D \to r} * H(D)_i}}},$$

wherein, $\chi_{ir}$ refers to the feature quantification value of the $r^{th}$ image feature element of the $i^{th}$ product with the quality accident, e refers to the natural constant, $H(S)_i$ refers to the image entropy value of the $i^{th}$ product with the quality accident, $H(D)_i$ refers to the image contrast index for the $i^{th}$ product with the quality accident, $\tau_{S \to r}$ refers to the quantitative feature impact factor of the given $r^{th}$ image feature element corresponding to the image entropy value, and $\tau_{D \to r}$ refers to the quantitative feature impact factor of the given $r^{th}$ image feature element corresponding to the image contrast index.

The second aspect of the present invention provides a classification system for product quality accidents based on convolutional neural networks, which consists of a quality accident classification module, which is used to collect sample data of product quality accidents, label products suffered quality accidents as products with quality accidents, and thus the accident severity evaluation index for each product with the quality accident can be generated by analysis.

An image feature element extraction module, which is used to extract various image feature elements of the product with the quality accident, from which the evaluation values of accident relevance of various image feature elements can be obtained through analyzing, after that, various valid feature elements can be obtained by screening based on the evaluation values of accident relevance of various image feature elements.

A classification model training module, which is used to train various valid feature elements to generate the product quality accident classification model, then, get a target product to perform the product quality accident classification based on the product quality accident classification model.

A quality control database, which is used to store the sample data of product quality accidents, and the accident levels corresponding to intervals of each accident severity evaluation index, as well as the threshold values of relevancy evaluation.

Compared to prior art, the embodiments of the present invention have at least the following advantages or beneficial effects:

(1) Based on providing a classification method for product quality accidents and its system based on convolutional neural networks, present invention compares the images of quality accidents of the products with quality accidents with the initial images and analyzes the economic losses caused by the product quality accident to scientifically and reasonably classify the accident, while the severity data of the quality accident and the image feature elements are used to perform model training, then, the product quality accidents can be classified by such a product quality accident classification model, so that the subjective errors due to human judgment can be reduced and the objectivity and consistency of the quality accident evaluation results can be improved.

(2) The present invention helps to classify product quality accidents by comparing the differences between the images of product quality accidents and the initial images. Thus, the impact degree of quality accidents can be quickly evaluated by intuitive image comparison, providing a basis for classification of quality accidents.

(3) The present invention can evaluate the effect and severity of the accident by analyzing the losses incurred by the product quality accident, including the cost of repairing and the time it took to repair, and further the accident can be scientifically and reasonably classified to improve the accuracy of classification of product accidents.

(4) The present invention also can classify product quality accidents by training a product quality accident classification model, and thus the subjective errors due to human judgment can be reduced and the objectivity and consistency of the quality accident evaluation results can be improved based on the classification of product quality accidents by using such product quality accident classification model.

BRIEF DESCRIPTION OF THE DRAWINGS

Further illustration of the present invention can be made by using the accompanying drawings, however, all the embodiments described in the drawings do not constitute any limitation on the present invention. For ordinary technical personnel in the art, other drawings can be obtained based on the following drawings without creative labor.

FIG. 1 is a schematic diagram of the method flow of the present invention.

DETAILED DESCRIPTION OF THE EMBODIMENTS

Figure 2:
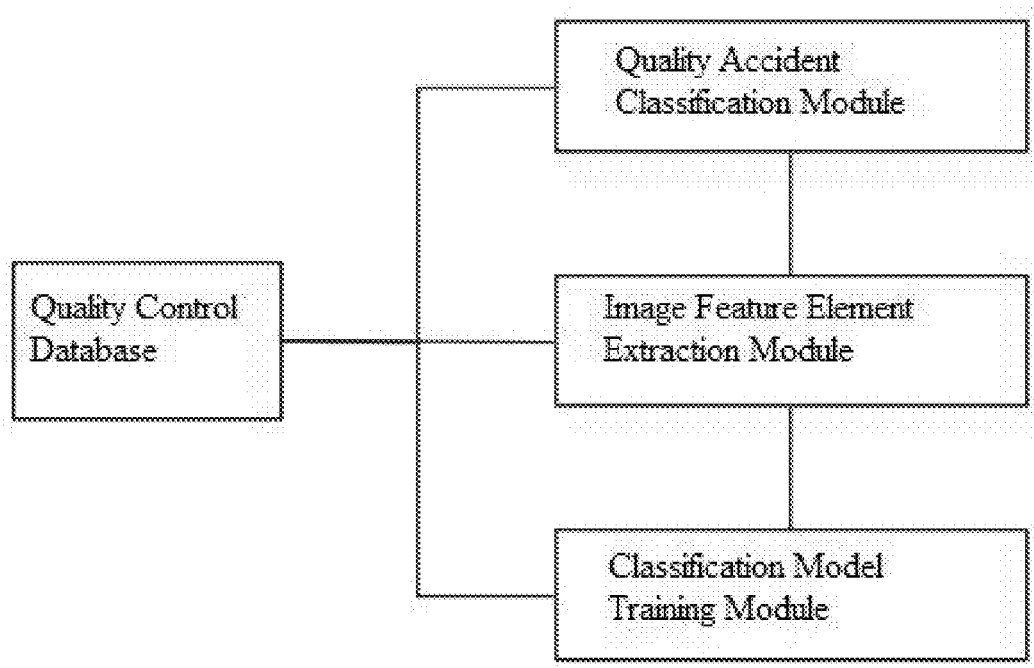
FIG. 2 is a schematic diagram of the system module connection of the present invention.

The text below will provide a clear and complete description of the technical scheme employed in the embodiments of the present invention, in conjunction with the accompanying drawings. It is evident that the embodiment described is only a part, not the whole, of the present invention.

On the basis of the embodiment of the present invention, all other embodiments obtained by those of ordinary skill in the arts without creative labor fall within the protection of the present invention.

Referring to FIG. 1, the first aspect of the present invention provides a classification method for product quality accidents based on convolutional neural networks, which consists of collecting the sample data of product quality accidents, labeling the products that suffered quality accidents as the products with quality accidents, respectively, and thus the accident severity evaluation indices of various products with quality accidents can be generated by analyzing It should be understood that the products mentioned in the specification refer to physical products such as electronic products, devices, and daily supplies.

In this embodiment, the sample data of product quality accidents was obtained by collecting the sample data of accidents from the products that have suffered quality accidents, including the initial images of each product with the quality accident, the images of quality accidents, the cost of repairing, and the time they took to repair. This sample data of product quality accidents belonged to historical data from previous classification of quality accidents, which could be employed to train product quality accident classification models.

To be more specific, the analysis process for obtaining the said accident severity evaluation index for each product with the quality accident consisted of extracting the initial images and images of quality accidents of each product with the quality accident based on the sample data of product quality accidents, and then comparing the initial images with the images of quality accidents of each product with the quality accident, and thus a quantitative index for the degree of damage of each product with the quality accident could be generated by analyzing.

It should be understood that the initial images of each product with the quality accident were flat images collected prior to each product with the quality accident being put into service, the images of quality accidents of each product with the quality accident also were flat images collected after the product quality accidents occurred. In addition, the degree of damage of the product with the quality accident could be evaluated by comparing the image differences of products after a quality accident occurred.

In a specific embodiment, the quantitative index for the degree of damage of each product with the quality accident could be generated not only by means of in-depth analysis of various performance parameters of the product through employing data analysis tools and techniques, but also by quantifying the degree of damage based on collecting user feedback related to the severity levels. For this purpose, several pixel points should be deployed to extract the pixel values of each pixel showed in the initial image of each product with the quality accident, while the pixel values of corresponding pixel points showed in the image of quality accident of each product with the quality accident were extracted. Thus, the quantitative index for the degree of damage of each product with the quality accident could be comprehensively calculate and the specific calculation expression employed was:

$$\varphi_{S \to i} = \frac{1}{m} \sum_{j=1}^{m} \sqrt{\frac{|P_{S \to ij} - P_{C \to ij}|}{\Delta P}} * \zeta,$$

wherein, $\varphi_{S \to i}$ referred to the quantitative index for the degree of damage of the $i^{th}$ product with the quality accident, $P_{S \to ij}$ referred to the pixel value of the $j^{th}$ pixel showed in the image of quality accident of the $i^{th}$ product with the quality accident, $P_{C \to ij}$ referred to the pixel value of the $j^{th}$ pixel showed in the initial image of the $i^{th}$ product with the quality accident, and $\Delta P$ referred to the given allowable deviation pixel value, and $\zeta$ referred to the given quantitative correction factor of the damage degree of product, i referred to the number of each product with the quality accident, and for 1,2,3, . . . , n, n referred to the total number of products with quality accidents, j referred to the number of each pixel point, for. j=1,2,3, . . . , m, M referred to the total number of pixel points.

In a specific embodiment, comparing the differences between images of product quality accidents and initial images was beneficial to classify product quality accidents, and the impact of quality accidents could be quickly evaluated based on intuitive image comparison, providing a basis for classification of quality accidents.

Obtaining the cost data of repairing each product with the quality accident and calculating the time it took to repair, and thus a quantitative index for the impact degree of each product with the quality accident can be generated after processing.

It should be understood that the cost of repairing each product with the quality accident refers to the total cost of recovering each product with the quality accident to normal function, and the time it took to repair refers to the total time spent on recovering each product with the quality accident to normal function. Thus, the impact degree caused by quality accidents of each product with the quality accident could be evaluated by analyzing the cost of repairing and the time it took to repair.

It should be understood that the quantitative evaluation index for the impact degree of each product with the quality accident are obtained by analyzing the cost of repairing the product with the quality accident and the time it took to repair, which can be used to evaluate the impact degree of each product with the quality accident and provide a data basis for the classification of quality accidents.

In a specific embodiment, the quantitative index for the impact degree of each product with the quality accident could not only be generated by collecting and analyzing previous quality accident data, including the frequency, effect, and impact degree of quality accidents, but also could be obtained by detailed analysis of the impact of quality accidents, including the impact of accidents on product performance, service life and safety, as well as user satisfaction. Thus, the impact degree of quality accidents on products could not only be learnt by analyzing, but also might be obtained through following calculation. More precisely, it was possible to generate the quantitative index for the impact degree of each product with the quality accident by performing a comprehensive calculation based on obtaining the predefined critical cost of repairing and critical duration of repairing of the product with the quality accident respectively. The specific calculation expression is:

$$\varphi_{Y \to i} = e \sqrt{\frac{R_{X \to i}}{R_{X \to 0}} * \psi_1 + \frac{R_{J \to i}}{R_{J \to 0}} * \psi_2 + R_{X \to i} * \psi_3 + R_{J \to i} * \psi_4},$$

wherein, $\varphi_{Y \to i}$ referred to the quantitative index for the impact degree of the $i^{th}$ product with the quality accident, e referred to a natural constant, $R_{X \to i}$ referred to the cost of repairing of the $i^{th}$ product with the quality accident, $R_{J \to i}$ referred to the time cost of repairing the $i^{th}$ product with the quality accident, $R_{X \to 0}$ referred to the predefined critical cost of repairing, and $R_{J \to 0}$ referred to the predefined critical duration of repairing, $\psi_1$ referred to the quantified weight factor of the impact degree corresponding to the given cost of repairing, $\psi_2$ referred to the quantified weight factor of the impact degree corresponding to the given time cost of repairing, and $\psi_3$ referred to the quantified weight factor of the impact degree corresponding to the given unit value of cost of repairing, as well as $\psi_4$ referred to the quantified weight factor of the impact degree corresponding to the given unit value of time cost of repairing.

In a specific embodiment, the effect and severity levels of the accident could be evaluated by analyzing the losses caused by the product quality accident, including the cost of repairing and the time it took to repair, and then the accuracy of classification of product accidents could be improved by scientific and reasonable classification of accidents.

The accident severity evaluation index for each product with the quality accident can be generated by a comprehensive analysis.

To be more specific, the accident severity evaluation index for each product with the quality accident, which was generated by analyzing the quantitative index for damage and impact of each product with the quality accident, could be used to quantitatively evaluate the accident severity levels of each product with the quality accident and provide a data basis for classification of quality accidents.

More precisely, the accident severity evaluation index for each product with the quality accident could not only be generated by comparing the severity levels of similar quality accidents in history or taking such data as a reference to determine the severity levels of existing accidents, but also by collecting and analyzing the data related to accidents, such as product qualification rate, complaint rate and return rate, etc. In addition, it can also be obtained through the following calculation expression:

$$\delta_i = \frac{lg\left(\sqrt{\varphi_{S \to i} * \xi_1 + \varphi_{Y \to i} * \xi_2} + 1\right)}{e},$$

wherein, $\delta_i$ referred to the accident severity evaluation index for the $i^{th}$ product with the quality accident, e referred to a natural constant, $\varphi_{S \to i}$ referred to the quantitative index for the damage degree of the $i^{th}$ product with the quality accident, $\varphi_{Y \to i}$ referred to the quantitative index for the impact degree of the $i^{th}$ product with the quality accident, $\xi_1$ referred to the accident severity impact factor corresponding to the given quantitative index for the damage degree, and $\xi_2$ referred to the accident severity impact factor corresponding to the given quantitative index for the impact degree.

Specifically, the quantitative index for the degree of damage of each product with the quality accident could be generated by comparing and analyzing the initial images and images of quality accidents of each product with the quality accident, which could be used to quantitatively evaluate the damage degree of each product with the quality accident and provide a data basis for classification of quality accidents.

It should be understood that the intervals of accident severity evaluation indices employed in this embodiment correspond to the accident levels respectively. From this, the accident level of the product with the quality accident can be obtained by analyzing the interval of accident severity evaluation index to which the product with the quality accident belongs.

It should be understood that in this embodiment, the accident level refers to the product quality accident level, which is usually divided based on factors such as the effect of the accident, the economic losses, the situation of personnel casualties, and the social impact, including minor accident level, general accident level, major accident level, and special major accident level.

Extracting the image feature elements of each product with the quality accident, and the evaluation values of accident relevance of various image feature elements can be obtained by analyzing based on the accident severity evaluation index for each product with the quality accident, after that, a valid feature element screening is performed according to the evaluation values of accident relevance of various image feature elements to obtain various valid feature elements.

It should be understood that the image feature elements of each product with the quality accident include the area, the depth and the form of damage, etc., which can be quantified in terms of two dimensions including image entropy and image contrast index.

Specifically, the specific analysis process for obtaining the evaluation values of accident relevance of various image feature elements consisted of obtaining the image entropy value and the image contrast index for each product with the quality accident through processing based on the image of quality accident of each product with the quality accident, and thus the feature quantification values of various image feature elements of each product with the quality accident can be obtained by a comprehensive analysis.

It should be understood that the image entropy and the image contrast index employed in this specification are only applicable to the processing of images of quality accidents for each product with the quality accident.

It should be understood that in this embodiment, the image entropy represents a measure of the amount of image information, reflecting the randomness and uncertainty of information of the image. During the process of image, it is commonly used to describe the texture complexity or distribution of information of the image. The image contrast index refers to the data obtained by quantifying the contrast of an image, which is a measure of the degree of difference between light and dark areas in the image. Wherein, high contrast indicates obvious changes in brightness of the image, while low contrast means the image is more uniform and the changes in brightness are inconspicuous. Thus, the image feature elements can be quantified in terms of two dimensions including image entropy and image contrast index, which can facilitate the analysis of the correlation between each image feature element and accident level.

In a specific embodiment, the image entropy values of various products with quality accidents could be obtained not only by converting the image from the spatial domain to the frequency domain, such as employing the Fast Fourier Transform (FFT) to calculate the entropy values of each frequency component of the frequency domain, and combining these entropy values to obtain the entropy value of the entire image, but also by using machine learning algorithms to classify the pixels or regions of the image, and thus the uncertainty of classification could be reflected by calculating the entropy value based on the classification results. Furthermore, it could be obtained by converting the images of quality accidents of each product with the quality accident into grayscale images, extracting the pixel values of each pixel point of the grayscale image, and dividing various pixel points into grayscale levels based on the pixel values (such as 256 grayscale levels), while obtaining the total number of pixels of the image of product quality accident and the number of pixels of each grayscale level, after that, calculating the image entropy value of each product with the quality accident comprehensively, and the specific calculation expression is:

$$H(S)_i = \omega^* \left[ -\sum_{t=1}^{s}(p_{it} * \log_2 p_{it}) \right],$$

wherein, $H(S)_i$ referred to the image entropy value of the $i^{th}$ product with the quality accident, $\omega$ referred to the given image entropy correction factor, t referred to the number of each grayscale level, for t=1,2,3, . . . , s, s referred to the total number of grayscale levels, and $p_{it}$ referred to the probability of the $t^{th}$ grayscale level of the $i^{th}$ product with the quality accident. In addition, the probability of grayscale level could be further analyzed based on the number of pixels, and the specific calculation formula was:

$$p_{it} = \frac{N_{it}}{N_{Z \to i}},$$

wherein, $N_{Z \to i}$ referred to the total number of pixels of the image of quality accident of the $i^{th}$ product with the quality accident, and $N_{it}$ referred to the number of pixels of the grayscale level of the $i^{th}$ product with the quality accident.

In a specific embodiment, the image contrast index for each product with the quality accident could not only be decomposed into components of different scales and directions through wavelet transform, and thus the contrast quantification index for the image can be obtained by analyzing the contrast of these components, but also be quantified by analyzing the edge strength of the image and measuring the sharpness of the image edge. In addition, the image contrast index can be generated by extracting the pixel values of each pixel point of the image of the product quality accident, and the maximum and minimum pixel values, and thus, the image contrast index for each product with the quality accident could be calculated comprehensively, and the specific calculation expression is:

$$H(D)_i = \upsilon_1 * \left[ \frac{1}{m-1} \sum_{j=1}^{m}\left( P_{S \to ij} - \frac{1}{m}\sum_{j=1}^{m} P_{S \to ij} \right)^2 \right] + \upsilon_2 * (P_{S \to i}^{max} - P_{S \to i}^{min}),$$

wherein, $H(D)_i$ referred to the image contrast index for the $i^{th}$ product with the quality accident, $\upsilon$ referred to the given image contrast index correction factor, $P_{S \to ij}$ referred to the pixel value of the $j^{th}$ pixel point of the image of quality accident of the $i^{th}$ product with the quality accident, $P_{S \to i}^{max}$ referred to the maximum pixel value of the image of quality accident of the $i^{th}$ product with the quality accident, $P_{S \to i}^{min}$ referred to the minimum pixel value of the image of quality accident of the $i^{th}$ product with the quality accident, $\upsilon_1$ referred to the image contrast index impact factor corresponding to the given pixel value variance, and $\upsilon_2$ referred to the image contrast index impact factor corresponding to the unit deviation of pixel value between the given maximum pixel value and the minimum pixel value.

To be more specific, the feature quantification values of various image feature elements of each product with the quality accident could be obtained by quantitatively analyzing the image feature elements in terms of two dimensions including image entropy and image contrast index, which could be used to quantitatively evaluate the severity of each image feature element, and provide a data basis for screening valid feature elements.

More precisely, the feature quantification values of various image feature elements of each product with the quality accident could be obtained not only by employing the principal component analysis to extract the main change direction of the image data, thereby quantifying the main features of the image, but also by using deep learning models such as convolutional neural networks to extract complex image feature elements and train them to obtain quantitative index. It also can be obtained based on the following calculation expression:

$$\chi_{ir} = \left(\frac{1}{e}\right)^{\frac{1}{\sqrt{\tau_{S \to r} * H(S)_i + \tau_{D \to r} * H(D)_i}}},$$

wherein, $\chi_{ir}$ referred to the feature quantification value of the $r^{th}$ image feature element of the $i^{th}$ product with the quality accident, $H(S)_i$ referred to the image entropy value of the $i^{th}$ product with the quality accident, $H(D)_i$ referred to the image contrast index for the $i^{th}$ product with the quality accident, $\tau_{S\to r}$ referred to the feature quantitative impact factor of the given $r^{th}$ image feature element corresponding to the image entropy value, and $\tau_{D\to r}$ referred to the feature quantitative impact factor of the given $r^{th}$ image feature element corresponding to the image contrast index.

Based on the accident severity evaluation index for each product with the quality accident and the feature quantification values of various image feature elements of each product with the quality accident, the evaluation values of accident relevance of each image feature element could be obtained by analyzing.

It should be understood that in this embodiment, the evaluation values of accident relevance of various image feature elements referred to the quantification values obtained through correlation analysis of the accident severity evaluation index for each product with the quality accident and the feature quantification values of various image feature elements of each product with the quality accident, which could be used to quantitatively evaluate the correlation between each image feature element and the severity of the accident and provide a data basis for screening valid feature elements.

In a specific embodiment, the evaluation values of accident relevance of various image feature elements could not only be used to simulate the process of quality accidents by computers through employing simulation method, and generate images of quality accidents, but also could be employed to compare with real images of quality accidents for analysis, and thus the relationship between features and severity levels can be derived by observing the changes in the feature elements of images of quality accidents after adjusting the parameters of the simulation. In addition, such values could be used to analyze existing product quality accident cases, and thus the images of quality accidents could be matched with the losses caused by quality accidents to establish the mapping relationship between features and severity levels. Furthermore, such values could be obtained by following calculation expression:

$$F_r = \left| \frac{\sum_{i=1}^{n}[(\chi_{ir} - \overline{\chi}_r)(\delta_i - \overline{\delta})]}{\sqrt{\sum_{i=1}^{n}(\chi_{ir} - \overline{\chi}_r)^2 * \sum_{i=1}^{n}(\delta_i - \overline{\delta})^2}} \right| * \varsigma,$$

wherein, $F_r$ referred to the evaluation value of the accident correlation degree of the $r^{th}$ image feature element, $\delta_i$ referred to the quantitative index of the impact degree of the $i^{th}$ product with the quality accident, $\chi_{ir}$ referred to the feature quantification value of the $r^{th}$ image feature element of the $i^{th}$ product with the quality accident, $\overline{\delta}$ referred to the quantitative index of average impact degree of the $i^{th}$ product with the quality accident, for $$\overline{\delta} = \frac{1}{n}\sum_{i=1}^{n}\delta_i,$$

$\overline{\chi}_r$ referred to the average feature quantification value of the $r^{th}$ image feature element, and for $$\overline{\chi}_r = \frac{1}{n}\sum_{i=1}^{n}\chi_{ir},$$

$\varsigma$ referred to the given accident correlation degree correction factor.

To be more specific, valid feature elements were screened based on the evaluation values of accident relevance of various image feature elements, and thus each valid feature element would be obtained. The specific analysis process consisted of comparing the evaluation values of accident relevance of various image feature elements with the threshold values of accident relevance stored in the quality control database. If the evaluation value of accident relevance of a certain image feature element was greater than or equal to the threshold value of accident relevance, such image feature element should be labeled as a valid feature element.

It should be understood that the threshold value of correlation degree evaluation of this embodiment was the critical index for evaluating the correlation degree. If the evaluation value of accident correlation degree of a certain image feature element was greater than or equal to the correlation degree evaluation threshold, it indicated that the image feature element had a high correlation with the accident correlation degree. Otherwise, if the evaluation value of accident correlation degree of a certain image feature element was less than the threshold value of correlation degree evaluation, it indicated that the correlation degree between the image feature element and the accident correlation degree was low.

In addition, a product quality accident classification model can be generated through training various valid feature elements, after that, getting a target product, and thus the product quality accident is classified according to the product quality accident classification model.

In a specific embodiment, the product quality accident classification model was generated through training aforesaid valid feature elements. Specifically, an accident classification function model would be established based on the correlation between various valid feature elements and the severity levels of the accident, and thus the accident classification indices for products with quality accidents could be generated based on the analysis through the accident classification function model. It should be understood that in this embodiment, the convolutional neural networks were used to analyze images of product quality accidents.

It should be understood that the accident classification index in this embodiment referred to a quantitative data obtained by analyzing the valid feature elements of the image of product quality accident, which could be used to measure the severity of the product quality accidents reflected by the valid feature elements and provide data support for the classification of product quality accidents.

In a specific embodiment, the product quality accidents were classified based on the image data of product quality accidents. To be more specific, taking the products need to be classified as quality accidents to be labeled as target products, then, obtaining various valid feature elements of the image of quality accident of the target product, and thus, each valid feature element was quantified in terms of two dimensions including image entropy and image contrast index to obtain the feature quantification values of various valid feature element, thereby obtaining the accident classification index for the target product through comprehensive calculation. The accident classification index could not only be employed to form an experiential classification of quality accidents system by summarizing the previous quality accidents, analyzing the causes, the effect and the handling measures of the accidents, but also could be classified based on factors including the severity levels, the scope of impact, the economic losses, and the social impact of the accidents. In addition, it could be obtained by means of following accident classification function model, and the specific function equation was:

$$\eta = \frac{1}{k}\sum_{q=1}^{k}(\gamma_q * \vartheta_q),$$

wherein, η referred to the accident classification index for the target product, $\gamma_q$ referred to the feature quantification value of the $q^{th}$ valid feature element, $\vartheta_q$ referred to the weight factor of impact of the classification index corresponding to the given $q^{th}$ valid feature element, and q referred to the number of each valid feature element, for q=1,2,3, . . . , k, k referred to the total number of valid feature elements.

In this embodiment, the accident classification index for the target product were matched with the accident levels corresponding to the given intervals of accident classification indices to obtain the accident level of the target product.

In a specific embodiment, the product quality accidents were classified by training a product quality accident classification model based on extracting image feature elements through convolutional neural networks. Thus, employing the product quality accident classification model to classify product quality accidents would reduce the subjective errors due to human judgment and improve the objectivity and consistency of the quality accident evaluation results.

Referring to FIG. 2, the second aspect of the present invention provides a classification system for product quality accidents based on convolutional neural networks consisting of a quality accident classification module, an image feature element extraction module, a classification model training module and a quality control database.

The said quality accident classification module is used to collect sample data of product quality accidents, label products suffered quality accidents as products with quality accidents, and thus the accident severity evaluation index for each product with the quality accident can be generated by analysis.

The said image feature element extraction module is used to extract various image feature elements of the product with the quality accident, from which the evaluation values of accident relevance of various image feature elements can be obtained through analyzing, after that, various valid feature elements can be obtained by screening based on the evaluation values of accident relevance of various image feature elements.

The said classification model training module is used to train various valid feature elements to generate the product quality accident classification model, then, get a target product to perform the product quality accident classification based on the product quality accident classification model.

The quality control database is used to store sample data of product quality accidents, accident levels corresponding to the severity evaluation index intervals of each accident, and relevant degree evaluation thresholds.

In a specific embodiment, a classification method for product quality accidents and its system based on convolutional neural networks was employed to compare the image of quality accident of the product with quality accident with the initial image and analyze the economic losses caused by the product quality accident to scientifically and reasonably classify the accident, while the severity data of the quality accident and the image feature elements were used to perform model training, then, the product quality accidents could be classified by such a product quality accident classification model, so that the subjective errors due to human judgment can be reduced and the objectivity and consistency of the quality accident evaluation results would be improved The foregoing is only an example and illustration of the construction of the present invention. Those skilled in the art may make various modifications or additions to the individual embodiment described, or replace it in a similar way. As long as they do not deviate from the structure of the invention, or exceed the limits defined in the present claims, they shall all fall within the protection of the present invention.

The invention claimed is:

1. A classification method for product quality accidents based on convolutional neural networks, characterized in that:

collecting the sample data of product quality accidents, labeling the products that suffered quality accidents as the products with quality accidents, respectively, and thus the accident severity evaluation indices of various products with quality accidents can be generated by computation;

extracting the image feature elements of each product with quality accident, and the evaluation values of accident relevance of various image feature elements can be obtained by analyzing based on the accident severity evaluation index for each product with quality accident, after that, a valid feature element screening is performed according to the evaluation values of accident relevance of various image feature elements to obtain various valid feature elements;

then, a product quality accident classification model can be generated through training various valid feature elements, after that, getting a target product, and thus the product quality accident is classified according to the product quality accident classification model;

the specific analysis process for obtaining the said accident severity evaluation index for each product with quality accident consists of:

extracting the initial images and images of quality accidents of each product with quality accident based on the sample data of product quality accidents, and then comparing the initial images with the images of quality accidents of each product with quality accident, and thus a quantitative index for the degree of damage of each product with quality accident can be generated by analyzing;

obtaining the cost data of repairing each product with quality accident and calculating the time it took to repair, and thus a quantitative index for the impact degree of each product with quality accident can be generated after processing and computation;

then, the accident severity evaluation index for each product with quality accident can be generated by a comprehensive analysis;

the specific analysis process for obtaining the evaluation values of accident relevance of various image feature elements consists of:

obtaining the image entropy value and the image contrast index for each product with quality accident through processing based on the image of quality accident of each product with quality accident, and thus the feature quantification values of various image feature elements of each product with quality accident can be obtained by a comprehensive computation;

based on the accident severity evaluation index for each product with quality accident and the feature quantification values of various image feature elements of each product with quality accident, the evaluation values of accident relevance of various image feature elements can be obtained by computation the specific calculation expression of the accident severity evaluation index for each product with quality accident is:

$$\delta_i = \frac{lg(\sqrt{\varphi_{S\to i}*\xi_1 + \varphi_{Y\to i}*\xi_2} + 1)}{e},$$

wherein, $\delta_i$ refers to the accident severity evaluation index for the $i^{th}$ product with quality accident, e refers to a natural constant, $\varphi_{S\to i}$ refers to the quantitative index for the damage degree of the $i^{th}$ product with quality accident, and $\varphi_{Y\to i}$ refers to the quantitative index for the impact degree of the $i^{th}$ product with quality accident, $\xi_1$ refers to the accident severity impact factor corresponding to the given quantitative index for the damage degree, as well as $\xi_2$ refers to the accident severity impact factor corresponding to the given quantitative index for the impact degree;

the specific calculation expression of the feature quantification values of various image feature elements of each product with quality accident is:

$$\chi_{ir} = \left(\frac{1}{e}\right)^{\frac{1}{\sqrt{\tau_{S\to r}*H(S)_i + \tau_{D\to r}*H(D)_i}}},$$

wherein, $\chi_{ir}$ refers to the feature quantification value of the $r^{th}$ image feature element of the $i^{th}$ product with quality accident, e refers to the natural constant, $H(s)_i$ refers to the image entropy value of the $i^{th}$ product with quality accident $H(D)_i$ refers to the image contrast index for the $i^{th}$ product with quality accident, $\tau_{S\to r}$ refers to the quantitative feature impact factor of the given $r^{th}$ image feature element corresponding to the image entropy value, and $\tau_{D\to r}$ refers to the quantitative feature impact factor of the given $r^{th}$ image feature element corresponding to the image contrast index;

the specific calculation expression of calculating the quantitative index for the degree of damage of each product with quality accident is:

$$\varphi_{S\to i} = \frac{1}{m}\sum_{j=1}^{m}\sqrt{\frac{|P_{S\to ij} - P_{C\to ij}|}{\Delta P}}*\zeta,$$

wherein, $\varphi_{S\to i}$ refers to the quantitative index for the degree of damage of the $i^{th}$ product with quality accident, $P_{S\to ij}$ refers to the pixel value of the $j^{th}$ pixel shows in the image of quality accident of the $i^{th}$ product with quality accident, $P_{C\to ij}$ refers to the pixel value of the $j^{th}$ pixel shows in the initial image of the $i^{th}$ product with quality accident, and $\Delta P$ refers to the given allowable deviation pixel value, and $\zeta$ refers to the given quantitative correction factor of the damage degree of product, i refers to the number of each product with quality accident, and for i=1,2,3, . . . , n, n refers to the total number of products with quality accidents, j refers to the number of each pixel point, for j=1,2,3, . . . , m, m refers to the total number of pixel points;

the specific calculation expression of calculating the quantitative index for the impact degree of each product with quality accident is:

$$\varphi_{Y\to i} = e^{\sqrt{\frac{R_{X\to i}}{R_{X\to 0}}*\psi_1 + \frac{R_{J\to i}}{R_{J\to 0}}*\psi_2 + R_{X\to i}*\psi_3 + R_{J\to i}*\psi_4}},$$

wherein, refers $\varphi_{Y\to i}$ to the quantitative index for the impact degree of the $i^{th}$ product with quality accident, e refers to a natural constant, $R_{X\to i}$ refers to the cost of repairing of the $i^{th}$ product with quality accident, $R_{J\to i}$ refers to the time cost of repairing the $i^{th}$ product with quality accident, $R_{X\to 0}$ refers to the predefined critical cost of repairing, and $R_{J\to 0}$ refers to the predefined critical duration of repairing, $\psi_1$ refers to the quantified weight factor of the impact degree corresponding to the given cost of repairing, $\psi_2$ refers to the quantified weight factor of the impact degree corresponding to the given time cost of repairing, and $\psi_3$ refers to the quantified weight factor of the impact degree corresponding to the given unit value of cost of repairing, as well as $\psi_4$ refers to the quantified weight factor of the impact degree corresponding to the given unit value of time cost of repairing;

the specific calculation expression of calculating the evaluation values of accident relevance of various image feature elements is:

$$F_r = \left|\frac{\sum_{i=1}^{n}[(\chi_{ir} - \overline{\chi}_r)(\delta_i - \overline{\delta})]}{\sqrt{\sum_{i=1}^{n}(\chi_{ir} - \overline{\chi}_r)^2 * \sum_{i=1}^{n}(\delta_i - \overline{\delta})^2}}\right|*\varsigma,$$

wherein, $F_r$ refers to the evaluation value of the accident correlation degree of the $r^{th}$ image feature element, $\delta_i$ refers to the quantitative index for the impact degree of the $i^{th}$ product with quality accident, $\chi_{ir}$ refers to the feature quantification value of the $r^{th}$ image feature element of the $i^{th}$ product with quality accident, $\overline{\delta}$ refers to the evaluation index for average accident severity of the product with quality accident, for $$\overline{\delta} = \frac{1}{n}\sum_{i=1}^{n}\delta_i,$$

$\overline{\chi}_r$ refers to the average feature quantification value of the $r^{th}$ image feature element, and for $$\overline{\chi}_r = \frac{1}{n}\sum_{i=1}^{n}\chi_{ir},$$

ç refers to the given accident correlation degree correction factor.

2. The said classification method for product quality accidents based on convolutional neural networks according to claim 1, characterized in that the quantitative evaluation data obtained by comparing and analyzing the initial images with the images of quality accidents of each product with quality accident can be used to quantitatively evaluate the degree of damage of each product with quality accident and provide a data basis for the classification of quality accident.

3. The said classification method for product quality accidents based on convolutional neural networks according to claim 1, characterized in that the specific analysis process of obtaining various image feature elements by screening valid feature elements based on the evaluation values of accident relevance of various image feature elements consists of:

Comparing the evaluation values of accident relevance of various image feature elements with the threshold values of accident relevance stored in the quality control database; if the evaluation value of accident relevance of a certain image feature element is greater than or equal to the threshold value of accident relevance, such image feature element shall be labeled as a valid feature element.

4. The said classification method for product quality accidents based on convolutional neural networks according to claim 1, characterized in that the quantitative evaluation value obtained by analyzing the quantitative index for damage degree and impact degree of each product with quality accident can be used to quantitatively evaluate the accident severity of each product with quality accident and provide the data basis for classification of quality accidents.

5. The said classification method for product quality accidents based on convolutional neural networks according to claim 1, characterized in that the quantitative data of various image feature elements obtained by quantitatively analyzing various image feature elements in terms of two dimensions including image entropy and image contrast index can be used to quantitatively evaluate the severity of each image feature element, and provide a data basis for screening valid feature elements.

6. A system for applying the classification method for product quality accidents based on convolutional neural networks according to claim 1, characterized in that consisting of:

a quality accident classification module, which is used to collect sample data of product quality accidents, label products suffered quality accidents as products with quality accidents, and thus the accident severity evaluation index for each product with quality accident can be generated by analysis;

an image feature element extraction module, which is used to extract various image feature elements of the product with quality accident, from which the evaluation values of accident relevance of various image feature elements can be obtained through analyzing, after that, various valid feature elements can be obtained by screening based on the evaluation values of accident relevance of various image feature elements;

a classification model training module, which is used to train various valid feature elements to generate the product quality accident classification model, then, get a target product to perform the product quality accident classification based on the product quality accident classification model;

a quality control database, which is used to store the sample data of product quality accidents, and the accident levels corresponding to intervals of each accident severity evaluation index, as well as the threshold values of relevancy evaluation.

7. A system for applying the classification method for product quality accidents based on convolutional neural networks according to claim 2, characterized in that consisting of:

a quality accident classification module, which is used to collect sample data of product quality accidents, label products suffered quality accidents as products with quality accidents, and thus the accident severity evaluation index for each product with quality accident can be generated by analysis;

an image feature element extraction module, which is used to extract various image feature elements of the product with quality accident, from which the evaluation values of accident relevance of various image feature elements can be obtained through analyzing, after that, various valid feature elements can be obtained by screening based on the evaluation values of accident relevance of various image feature elements;

a classification model training module, which is used to train various valid feature elements to generate the product quality accident classification model, then, get a target product to perform the product quality accident classification based on the product quality accident classification model;

a quality control database, which is used to store the sample data of product quality accidents, and the accident levels corresponding to intervals of each accident severity evaluation index, as well as the threshold values of relevancy evaluation.

8. A system for applying the classification method for product quality accidents based on convolutional neural networks according to claim 3, characterized in that consisting of:

a quality accident classification module, which is used to collect sample data of product quality accidents, label products suffered quality accidents as products with quality accidents, and thus the accident severity evaluation index for each product with quality accident can be generated by analysis;

an image feature element extraction module, which is used to extract various image feature elements of the product with quality accident, from which the evaluation values of accident relevance of various image feature elements can be obtained through analyzing, after that, various valid feature elements can be obtained by screening based on the evaluation values of accident relevance of various image feature elements;

a classification model training module, which is used to train various valid feature elements to generate the product quality accident classification model, then, get a target product to perform the product quality accident classification based on the product quality accident classification model;

a quality control database, which is used to store the sample data of product quality accidents, and the accident levels corresponding to intervals of each accident severity evaluation index, as well as the threshold values of relevancy evaluation.

9. A system for applying the classification method for product quality accidents based on convolutional neural networks according to claim 4, characterized in that consisting of:

a quality accident classification module, which is used to collect sample data of product quality accidents, label products suffered quality accidents as products with quality accidents, and thus the accident severity evaluation index for each product with quality accident can be generated by analysis;

an image feature element extraction module, which is used to extract various image feature elements of the product with quality accident, from which the evaluation values of accident relevance of various image feature elements can be obtained through analyzing, after that, various valid feature elements can be obtained by screening based on the evaluation values of accident relevance of various image feature elements;

a classification model training module, which is used to train various valid feature elements to generate the product quality accident classification model, then, get a target product to perform the product quality accident classification based on the product quality accident classification model;

a quality control database, which is used to store the sample data of product quality accidents, and the accident levels corresponding to intervals of each accident severity evaluation index, as well as the threshold values of relevancy evaluation.

10. A system for applying the classification method for product quality accidents based on convolutional neural networks according to claim 5, characterized in that consisting of:

a quality accident classification module, which is used to collect sample data of product quality accidents, label products suffered quality accidents as products with quality accidents, and thus the accident severity evaluation index for each product with quality accident can be generated by analysis;

an image feature element extraction module, which is used to extract various image feature elements of the product with quality accident, from which the evaluation values of accident relevance of various image feature elements can be obtained through analyzing, after that, various valid feature elements can be obtained by screening based on the evaluation values of accident relevance of various image feature elements;

a classification model training module, which is used to train various valid feature elements to generate the product quality accident classification model, then, get a target product to perform the product quality accident classification based on the product quality accident classification model;

a quality control database, which is used to store the sample data of product quality accidents, and the accident levels corresponding to intervals of each accident severity evaluation index, as well as the threshold values of relevancy evaluation.

* * * * *